J. S. Rogers.
Sink-Trap.
Nº 72909.  Patented Dec. 31, 1867.
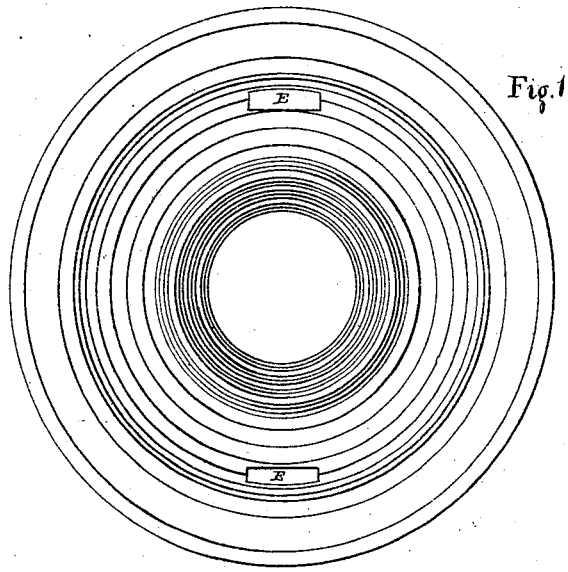
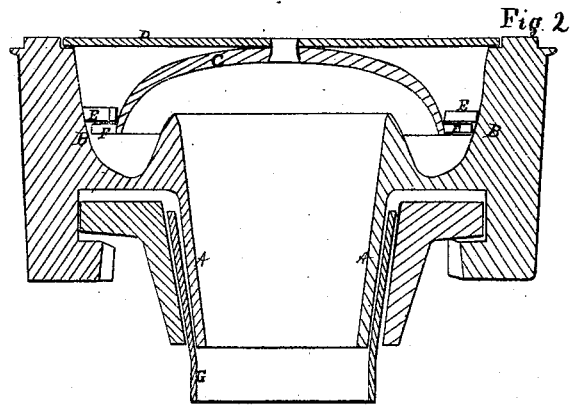
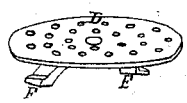
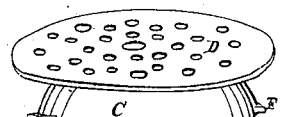
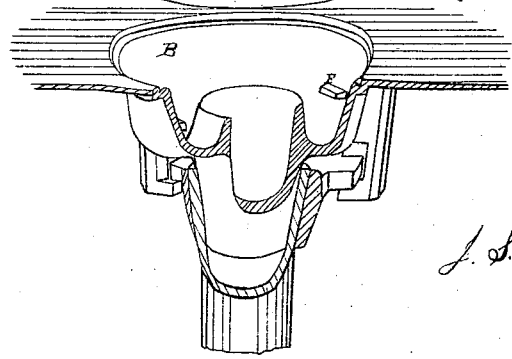
Witnesses
Thos. J. Parker
Chas. Hadaway
Inventor.
J. S. Rogers.
By his atty
Rob't Smith
451 Seventh St.

United States Patent Office.

JAMES S. ROGERS, OF WORCESTER, MASSACHUSETTS.

Letters Patent No. 72,909, dated December 31, 1867.

IMPROVED SINK-TRAP.

*The Schedule referred to in these Letters Patent and making part of the same.*

TO ALL WHOM IT MAY CONCERN:

Be it known that I, JAMES S. ROGERS, of Worcester, in the county of Worcester, and State of Massachusetts, have invented a new and useful Improvement in Sink-Traps; and I do hereby declare the following to be a full, clear, and exact description of the same, reference being had to the accompanying drawings, in which—

Figure 1 shows a plan of my invention.

Figure 2, a section (vertical) of the same.

Figure 3, a perspective view of the same with a portion removed, the better to show the different parts; and Figure 4, a mode of attaching the strainer, the trap being dispensed with.

This invention consists in the construction of kitchen-sink strainers and traps, so that they may be removed readily without disturbing the coupling which secures the waste-pipe to the sink.

As iron kitchen-sinks are commonly constructed, the strainer or trap-cover is secured in place by the same bolts which secure the drain-pipe coupling, and it is therefore impossible to remove the strainer or trap-cover for the purpose of cleaning, &c., without loosening the coupling-joint, and this is objectionable, because it requires unnecessary labor, and it is troublesome to make the joint tight again.

In my sink there is a tapering pipe, A, extending a short distance downward from the bottom of the sink, and this short pipe A projects into the mouth of the waste-pipe G, which is secured by a collar, and some suitable means, as shown in fig. 2. Surrounding the upper end of the pipe A are the bowl B and cover C, which together form an ordinary trap to prevent foul gases from coming out of the waste-pipe into the room. The strainer D covers the bowl B, to prevent the passage of large and hard substances into the trap. Matter will, however, inevitably pass through the strainer and lodge in the bottom of the bowl B, and finally obstruct the passage of fluid under the edges of the trap-cover, and it is therefore necessary to remove said cover from time to time, to clear out these obstructions, while it also is desirable to have the strainer and cover secured in place in such a manner as to prevent its accidental removal. I therefore construct the bowl B with the two projecting lugs E E, beneath which corresponding lugs F F, projecting from the edge of the trap-cover or from some other part beneath the strainer, will engage when the strainer and cover are placed in their proper seat and partially rotated. If the trap is formed by bends in the waste-pipe below the sink, nothing will be required at the top but a strainer, and that may be with facility and equal advantage secured in the same manner.

Having thus described my invention, its construction and operation, what I claim as new, is—

A trap for an iron kitchen-sink, constructed with lugs E F, or their equivalents, to secure the strainer or cover in position, so that the same may be removed without disturbing the waste-pipe coupling, substantially as described.

JAS. S. ROGERS.

Witnesses:
J. H. GLEASON,
J. N. ROSS.